(12) United States Patent
Clement et al.

(10) Patent No.: US 9,360,139 B1
(45) Date of Patent: Jun. 7, 2016

(54) NON-CORROSIVE LOW FRICTION PIPE SUPPORT

(76) Inventors: Timothy E. Clement, New Iberia, LA (US); Timothy Tyler Clement, New Iberia, LA (US)

( * ) Notice: Subject to any disclaimer, the term of this patent is extended or adjusted under 35 U.S.C. 154(b) by 522 days.

(21) Appl. No.: 12/729,417

(22) Filed: Mar. 23, 2010

(51) Int. Cl.
*F16L 3/00* (2006.01)
*F16L 13/10* (2006.01)
*F16L 3/12* (2006.01)

(52) U.S. Cl.
CPC . *F16L 13/10* (2013.01); *F16L 3/12* (2013.01); *F16L 3/1226* (2013.01)

(58) Field of Classification Search
CPC .......... F16L 3/02; F16L 55/168; F16L 57/06; F16L 13/10; F16L 3/12; F16L 3/1226; F16L 3/1207
USPC ............ 248/73, 78, 49, 58, 65; 138/147, 149, 138/157, 155, 106, 103, 140, 110; 285/47, 285/45, 53; 174/144, 140 R
See application file for complete search history.

(56) References Cited

U.S. PATENT DOCUMENTS

| | | | | | |
|---|---|---|---|---|---|
| 2,919,721 | A * | 1/1960 | Isenberg | ............... | F16L 59/166 138/109 |
| 3,026,076 | A * | 3/1962 | Bender | ................. | F16L 3/1218 138/106 |
| 3,058,860 | A * | 10/1962 | Rutter | .................. | F16L 59/023 138/147 |
| 3,185,763 | A * | 5/1965 | Harmon | ................. | H01B 17/42 174/144 |
| 3,289,704 | A * | 12/1966 | Nicosia | ............... | B29C 44/1295 138/141 |
| 3,315,927 | A * | 4/1967 | Malloy | ..................... | F16L 3/16 248/55 |
| 3,980,262 | A * | 9/1976 | Lee | ...................... | F16L 59/135 248/49 |
| 4,017,046 | A * | 4/1977 | Hicks | ....................... | F16L 3/16 248/49 |
| 4,040,447 | A * | 8/1977 | Scott | ...................... | C23F 13/02 138/103 |
| 5,762,300 | A * | 6/1998 | Sorkin | ...................... | E04C 5/10 248/72 |
| 6,182,930 | B1 * | 2/2001 | Lindborg | ................. | H02G 3/22 348/49 |
| 6,315,006 | B1 * | 11/2001 | Opperthauser | ......... | F16L 59/14 138/149 |
| 6,691,742 | B1 * | 2/2004 | Cooper | ..................... | F16L 3/14 138/106 |
| 7,744,041 | B2 * | 6/2010 | Boudreau | ................. | F16L 3/02 174/40 R |
| 8,074,943 | B2 * | 12/2011 | Boudreau | ............... | F16L 3/221 174/40 R |
| 8,087,431 | B2 * | 1/2012 | Souza | ...................... | F16L 3/02 138/103 |
| 2010/0294389 | A1 * | 11/2010 | Souza | ...................... | F16L 3/02 138/110 |

OTHER PUBLICATIONS

Afro Plastics: Afro Plastics—Nylatron: Website, Mar. 4, 2010.

* cited by examiner

*Primary Examiner* — Todd M Epps

(57) ABSTRACT

A pipe and pipe support interface structure comprised of a fiberglass C-shaped bearing surface saddle structure having a high strength, low friction, non-corrosive bearing surface block comprised of UHMWPE or other suitable polymer materials is disclosed. The bearing surface saddle structure is adhesively bonded to the exterior surface of a pipe following appropriate pipe surface preparation at locations where the pipe contacts a pipe support surface. The bearing surface block of the bearing surface structure provides an interface between the pipe and pipe support surface in order to protect the pipe from wear caused by bearing on a pipe support. The C-shaped bearing surface saddle structure described will increase the load bearing area of the pipe at the pipe support and serve to prevent wear on both the pipe and the pipe support. The C-shaped bearing surface saddle structure and method may be employed in the field as part of a maintenance and repair program.

20 Claims, 2 Drawing Sheets

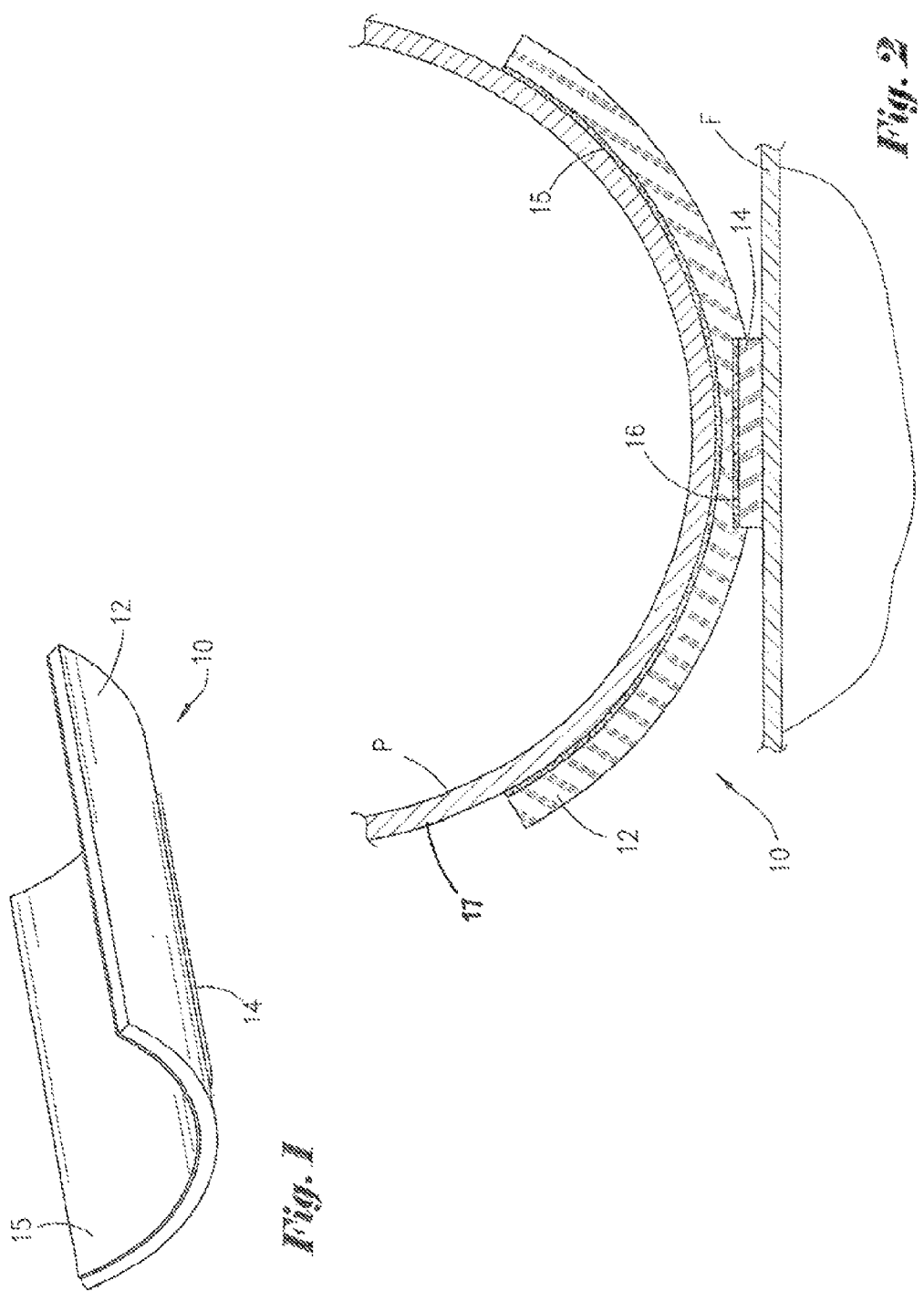

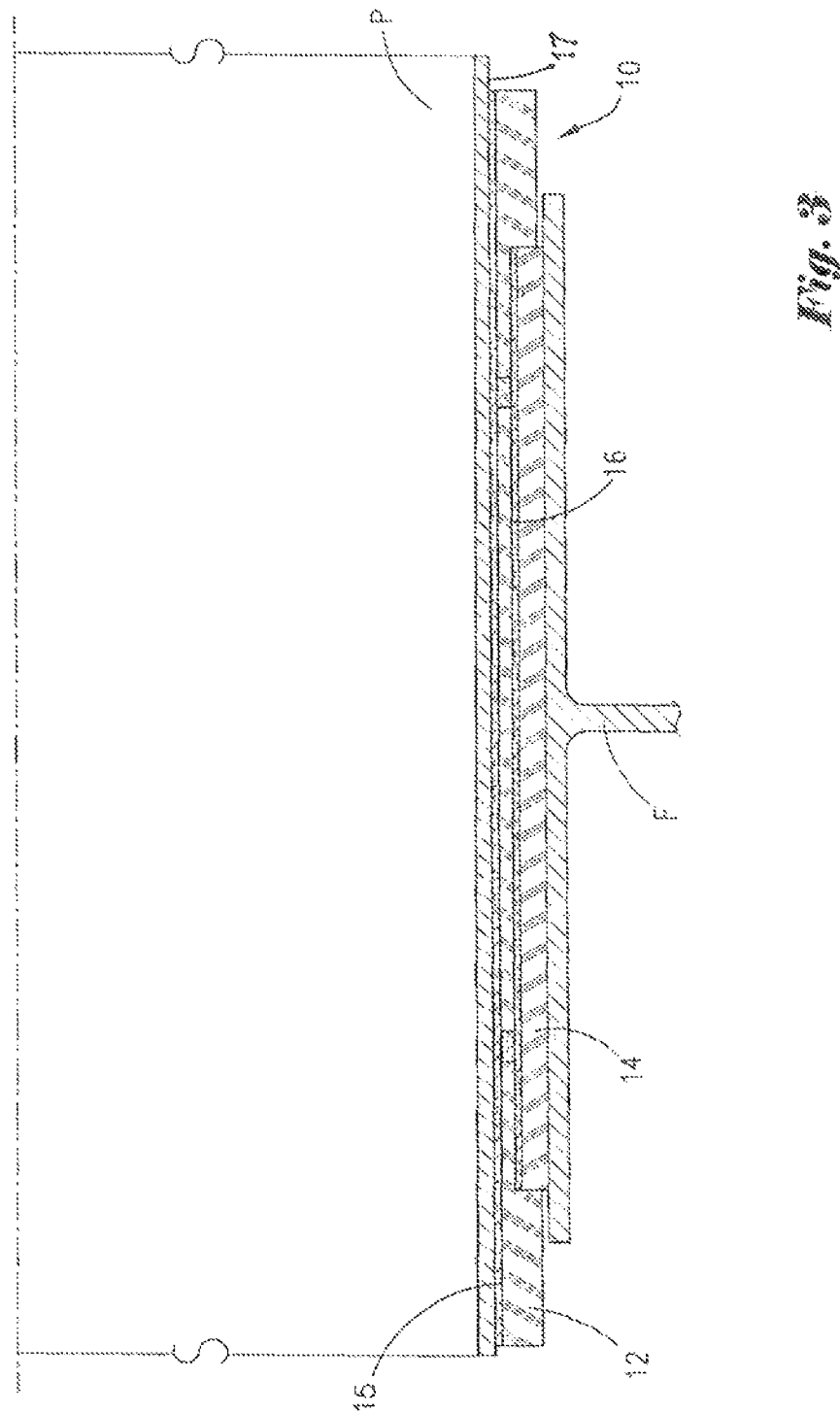

NON-CORROSIVE LOW FRICTION PIPE SUPPORT

FIELD OF INVENTION

The subject invention relates generally to pipe support structures and, more particularly, relates to a non-corrosive, high strength, pipe covering to increase pipe bearing surface area and reduce wear and corrosion on pipe support bearing surfaces.

BACKGROUND OF INVENTION

Some environments where piping systems are placed can be harsh. Piping systems used in offshore marine environments are particularly harsh and piping systems in such environments are exposed to the rigors of high winds, salt, and sea spray which can damage and corrode the piping systems. Such damage is particularly prevalent at the pipe and pipe support surfaces where the effects of stress and strain on the pipe systems combine with effects to the harsh weather environment to accelerate such corrosion and damage. Consequently, a need exists for a high strength, corrosion resistant pipe coating and pipe support system.

SUMMARY OF INVENTION

The present invention provides an apparatus and method for a high strength, corrosion resistant, pipe coating and pipe support system. The apparatus and method is intended to increase the load bearing surface area of the pipe at locations where the pipe is in contact with a pipe support surface. The apparatus and method is particularly suitable for use in harsh marine environments which subject a pipe system to salt, spray, and wind.

The device consists of a pipe and pipe support interface structure comprised of a fiberglass C-shaped bearing surface saddle structure that is intended to be matched with and adhesively bonded to a segment of pipe in the piping system at a pipe support location. The C-shaped bearing surface saddle structure is intended as a pipe covering to provide to provide protection to the pipe from wear caused by the pipe support and corrosive elements in the environment where the piping system is located.

It is intended that the C-shaped bearing surface saddle have a bearing surface formed from a block of ultra high molecular weight polyethylene (UHMWPE), also known as high-modulus polyethylene (HMPE) or high-performance polyethylene (HPPE), or another suitable bearing material. The bearing surface block provides a low friction interface surface between a pipe and pipe support of a piping system. The bearing surface block serves to increase the load bearing area of the pipe on the surface of the pipe support and prevents or attenuates the wear on the pipe. Other suitable polymer materials for the bearing surface block are thought to be nylon or Nylatron® polymers as manufactured by Quadrant EPP USA Inc.

The bearing surface block is affixed to the fiberglass C-shaped saddle structure by means of an adhesive. It is thought that an adhesive such as 3M™ Scotch-Weld™ DP-8010 Structural Plastic Adhesive as manufactured by 3M Company will adequately adhere the bearing surface block to the fiberglass C-shaped saddle structure. The C-shaped bearing surface saddle structure is then affixed between the pipe and its support by means of a suitable adhesive following surface preparation.

Preparation of the surfaces between the fiberglass saddle and the bearing surface block includes the following steps: first, removing any large particulate present on the bonding surfaces; then, cleaning the bonding surfaces with isopropyl alcohol (IPA) and water solution; and then placing a layer of adhesive on the bonding surface between the bearing surface block and the surface of the C-shaped saddle in order to bond the block to the C-shaped saddle. The amount of adhesive between the prepared bonding surfaces of the C-saddle and the bearing surface block is sufficient to cover the entire contact surface area. The adhesive is then allowed to dry for 1.5 to 2 hours.

A bonding surface to secure the C-shaped bearing surface saddle structure to a pipe is prepared by adhering one side of a double sided adhesive tape fastener to the fiberglass C-shaped saddle. A double-sided adhesive fastener tape such as 3M™ VHB™ Tape 5952 as manufactured by 3M Company is thought to be suitable for such purpose. The opposite side of the adhesive fastener tape is left protected until the C-shaped saddle is to be applied to a pipe.

The present invention provides an apparatus and method that can be applied in the field as part of a piping system maintenance and inspection program.

BRIEF DESCRIPTION OF THE DRAWINGS

FIG. 1 is pipe bearing surface saddle of applicant's invention.

FIG. 2 is an illustrative cross-sectional end view of the pipe support structure incorporating the pipe bearing surface saddle shown in FIG. 1.

FIG. 3 is an illustrative side elevation view of the pipe support structure incorporating the pipe bearing surface saddle shown in FIG. 1.

DESCRIPTION OF PREFERRED EMBODIMENT

FIG. 1 shows and illustrative view of the pipe bearing surface saddle structure (10) of applicant's invention. As shown in FIG. 1, is comprised of a fiberglass saddle (12) to which is mounted a high strength, low friction, non-corrosive bearing surface block (14). The bearing surface block (14) is comprised of a polymer material such as ultra high molecular weight polyethylene (UHMWPE), also known as high-modulus polyethylene (HMPE) or high-performance polyethylene (HPPE). The bearing surface block (14) may also be comprised of other suitable polymer materials such as nylon or Nylatron® polymers as manufactured by Quadrant EPP USA Inc. Such polymer bearing surface blocks (14) may incorporate a molybdenum disulfide lubricant powder to facilitate reduced resistance to sliding between the block (14) and a pipe support surface.

The bearing surface block (14) is bonded to the saddle (12) by means of a layer of adhesive layer (16) that is applied between the saddle (12) and the bearing surface block (14). It is thought that an adhesive layer (16) comprised of a structural plastic adhesive such as 3M™ Scotch-Weld™ DP-8010 as manufactured by 3M Company will satisfactorily adhere the bearing surface block (14) to the fiberglass saddle (12).

As shown in FIGS. 2 and 3, the fiberglass saddle (12) of the pipe bearing surface saddle structure (10) is adhesively bonded or otherwise mounted onto a pipe (P) by means of a layer of adhesive (15) between the saddle (12) and the outer underside surface (17) of pipe (P) at a point where the pipe (P) is in contact with a pipe support structure (F). The saddle structure (10) will provide a low friction bearing surface for the supported pipe (P) by means of the bearing surface block (14) and increase the load bearing area of the pipe (P) at the pipe support (F).

In the embodiment shown in the FIGS. 2 and 3, the adhesive (15) for adhesively bonding the saddle structure (10) on a pipe (P) is a double-sided adhesive tape fastener such as 3M™ VHB™ Tape 5952 as manufactured 3M Company. The double-sided tape adhesive will facilitate the installation of the saddle structure (10) to a pipe (P) in a field application. It is anticipated that the fiberglass saddle (12) of the saddle structure (10) will extend no more than in a 180° arc around the lower surface of the pipe (P). The fiberglass saddle (12) provides a corrosion resistant protective covering for the pipe (P). The saddle structure (10) may be sized and dimensioned as needed to fit a variety of pipe diameters.

It is thought that the bearing surface block (14) of the saddle structure (10) will provide a low friction surface between the pipe (P) and pipe support (F) of a piping system. The bearing surface block (14) will be of sufficient surface area and thickness to spread the load of the pipe (P) upon the surface area of the pipe support (F) and thereby decrease the load bearing pressure on the pipe support (F) as compared to a pipe (P) without a saddle structure (10).

The increased load bearing surface and the low frictional resistance of the bearing surface block (14) on the pipe support (F) will serve to resist abrasion and prevent or attenuate the wear on pipe (P) and pipe support (F). In addition to abrasion and wear resistance, the bearing surface block (14) will also provide electrical resistance between the pipe support (F) and the pipe (P). It is thought the load bearing surface between the pipe support (F) and the surface block (14) will have a coefficient of friction of 0.17 or less when the surface of the pipe support (F) is polished steel.

The pipe bearing surface saddle structure (10) and method as described by applicant can be applied to a pipe system in the field as part of a piping system maintenance or upgrade program for corrosion control and/or repair. This method will include the steps of inspecting a pipe (P) and supports (F) of an existing piping system and included pipe support structures; removing and cleaning any corrosion, dirt or foreign substance present on the pipe (P) and pipe support (F); providing a layer of adhesive (15) for bonding the C-shaped saddle (12) to the pipe (P) as necessary; and bonding the C-shaped saddle (12) of pipe support structure (10) to the pipe (P) so that the bearing block (14) is in contact with the pipe support (F) so that the pipe (P) is supported by the pipe support structure (10) upon the pipe support (F). The method may include providing double sided adhesive tape as the step for providing a layer of adhesive (15) for bonding the C-shaped saddle (12) to the pipe (P).

It is thought that the pipe bearing surface saddle structure and method of the present invention and many of its attendant advantages will be understood from the foregoing description. It is also thought that one may make various changes in the form, construction and arrangement of the parts of the pipe support device and method without sacrificing its material advantages or departing from the spirit and scope of the invention.

We claim:

1. A pipe and a pipe support in combination, comprising:
   (a) the pipe;
   (b) the pipe support, said pipe generating a load;
   (c) a C-shaped saddle configured to support said pipe;
   (d) a rectangular polymer bearing surface block supporting said C-shaped saddle; and
   (e) an adhesive layer bonding said C-shaped saddle to said bearing surface block, said bearing surface block positioned between said C-shaped saddle and said pipe support, thereby spreading said load generated by said pipe to said bearing surface block on said pipe support thereby prodding an increased surface area for distributing said pipe load on said pipe support.

2. The pipe and pipe support interface structure as recited in claim 1 wherein said polymer bearing surface block is comprised of ultra-high molecular weight polyethylene.

3. The pipe and pipe support interface structure as recited in claim 1 wherein said polymer bearing surface block is comprised of nylon.

4. The pipe and pipe support interface structure as recited in claim 3 wherein said polymer bearing surface block includes molybdenum disulfide lubricant powder.

5. The pipe and pipe support interface structure as recited in claim 2 wherein said adhesive layer is a structural plastic adhesive.

6. The pipe and pipe support interface structure as recited in claim 5 wherein said C-shaped saddle is fiberglass.

7. The pipe and pipe support interface structure as recited in claim 4 wherein said C-shaped saddle is fiberglass.

8. The pipe and pipe support interface structure as recited in claim 7 wherein said adhesive layer is a structural adhesive.

9. A pipe support interface structure comprising:
   (a) a C-shaped saddle configured to support a pipe, said pipe generating a pipe load;
   (b) a polymer bearing surface block supporting said saddle;
   (c) a first adhesive layer and a second adhesive layer, said first adhesive layer adhesively bonding said bearing surface block to said C-shaped saddle, said second adhesive layer adhesively bonding said C-shaped saddle to said pipe and wherein said bearing surface block is positioned between said C-shaped saddle and a pipe support surface; and
   (d) whereby said bearing surface block provides an increased load bearing surface area between said pipe and said pipe support surface for distributing said pipe load to said pipe support surface.

10. The pipe support interface structure recited in claim 9 wherein said polymer bearing surface block is a rectangular block comprised of ultra-high molecular weight polyethylene and said C-shaped saddle is fiberglass.

11. The pipe support interface structure as recited in claim 9 wherein said polymer beating surface block is comprised of nylon.

12. The pipe support interface structure as recited in claim 10 wherein said polymer bearing surface block includes molybdenum disulfide lubricant powder.

13. The pipe support interface structure as recited in claim 10 wherein said first adhesive layer is a structural plastic adhesive.

14. The pipe support interface structure as recited in claim 13 wherein said second adhesive layer is double-side adhesive tape.

15. A method for providing a pipe and pipe support interface structure between the pipe and a pipe support comprising the steps of:
   (a) providing the pipe;
   (b) providing a pipe support surface, said pipe creating a load on said pipe support surface;
   (c) removing and cleaning any corrosion, dirt or foreign substance from said pipe and said pipe support surface;
   (d) providing a C-shaped saddle, said C-shaped saddle having a polymer bearing surface block adhesively bonded to said C-shaped saddle, said block providing an increased bearing surface between said C-shaped saddle and said pipe support surface;

(e) providing a layer of adhesive between said C-shaped saddle and said pipe surface;
(f) adhesively bonding said C-shaped saddle to said pipe surface; and
(i) positioning said C-shaped saddle between said pipe surface and said pipe support surface whereby said polymer bearing surface block is in contact with said pipe support surface, thereby distributing said load generated by said pipe across said pipe support surface.

16. The method as recited in claim 15 wherein said step of providing a layer of adhesive between said C-shaped saddle and said pipe surface includes providing double sided adhesive tape.

17. The method as recited in claim 16 wherein said step of providing a C-shaped saddle includes providing a C-shaped saddle made of fiberglass and wherein said polymer bearing surface block is a rectangular block adhesively bonded to said fiberglass C-shaped saddle with structural plastic adhesive.

18. The method as recited in claim 17, wherein said step of providing a C-shaped saddle attached to said polymer bearing surface block includes constructing said polymer bearing surface block from ultra high molecular weight polyethylene.

19. The method as recited in claim 17, wherein said step of providing a C-shaped saddle attached to said polymer bearing surface block includes constructing said polymer bearing surface block from nylon.

20. The method as recited in claim 19, wherein said step of providing a C-shaped saddle attached to said polymer bearing surface block includes constructing said polymer bearing surface block from molybdenum disulfide lubricant powder.

* * * * *